(12) United States Patent  (10) Patent No.: US 8,462,994 B2
Ortiz et al.  (45) Date of Patent: Jun. 11, 2013

(54) METHODS AND SYSTEMS FOR PROVIDING ENHANCED SECURITY OVER, WHILE ALSO FACILITATING ACCESS THROUGH, SECURED POINTS OF ENTRY

(75) Inventors: Luis M. Ortiz, Albuquerque, NM (US); Kermit D. Lopez, Albuquerque, NM (US)

(73) Assignee: Random Biometrics, LLC, Plano, TX (US)

( * ) Notice: Subject to any disclaimer, the term of this patent is extended or adjusted under 35 U.S.C. 154(b) by 350 days.

(21) Appl. No.: 12/885,087

(22) Filed: Sep. 17, 2010

(65) Prior Publication Data

US 2011/0001827 A1    Jan. 6, 2011

Related U.S. Application Data

(63) Continuation-in-part of application No. 12/756,855, filed on Apr. 8, 2010, which is a continuation of application No. 10/321,872, filed on Dec. 17, 2002, now Pat. No. 7,921,297, which is a continuation-in-part of application No. 09/757,903, filed on Jan. 10, 2001, now abandoned.

(51) Int. Cl.
*G06K 9/00* (2006.01)
*G05B 19/00* (2006.01)

(52) U.S. Cl.
USPC .......................................... 382/115; 340/5.8

(58) Field of Classification Search
USPC ................. 382/115–124; 340/5.8, 5.81, 5.82, 340/5.83, 5.86
See application file for complete search history.

(56) References Cited

U.S. PATENT DOCUMENTS

| 5,021,776 A | 6/1991 | Anderson et al. |
| 5,229,764 A | 7/1993 | Matchett et al. |

(Continued)

FOREIGN PATENT DOCUMENTS

| EP | 0 613 576 B1 | 6/1996 |
| EP | 0 752 143 B1 | 12/1997 |
| EP | 0 630 504 B1 | 5/2000 |
| WO | WO 00/54214 A1 | 9/2000 |

OTHER PUBLICATIONS

Malmsten, V., "Eye Scans—Authentication with Biometrics," Sans Institute, Information Security Reading Room, Nov. 21, 2000.

(Continued)

*Primary Examiner* — Daniel Mariam
(74) *Attorney, Agent, or Firm* — Kermit D. Lopez; Luis M. Ortiz; Ortiz & Lopez, PLLC

(57) ABSTRACT

Systems and methods provide the verification of a registered user with authorized access through a point of entry in coordination with registered user profile information obtained from a remote server after preliminary identification of the registered user based on an identification number obtained wirelessly from an RFID tag carried by the registered user when the user is located near a point of entry. Registered user profile information including at least one of a photograph, biometric template, and a user name can be obtained by a computer at a point of entry from a remote server after preliminary identification of the user based on an identification number wirelessly provided to a RFID reader from a RFID carried by a registered user when the user is located near a point of entry such as, for example, a sports venue, border crossing or access point to a secured facility.

30 Claims, 5 Drawing Sheets

U.S. PATENT DOCUMENTS

| | | | |
|---|---|---|---|
| 5,291,560 | A | 3/1994 | Daugman |
| 5,469,506 | A | 11/1995 | Berson et al. |
| 5,586,186 | A | 12/1996 | Yuval et al. |
| 5,617,082 | A | 4/1997 | Denison et al. |
| 5,712,912 | A | 1/1998 | Tomko et al. |
| 5,719,950 | A | 2/1998 | Osten et al. |
| 5,725,480 | A | 3/1998 | Oosta et al. |
| 5,737,439 | A | 4/1998 | Lapsley et al. |
| 5,751,836 | A | 5/1998 | Wildes et al. |
| 5,787,187 | A | 7/1998 | Bouchard et al. |
| 5,790,668 | A | 8/1998 | Tomko |
| 5,802,199 | A | 9/1998 | Pare, Jr. et al. |
| 5,806,040 | A | 9/1998 | Vensko |
| 5,815,252 | A | 9/1998 | Price-Francis |
| 5,842,194 | A | 11/1998 | Arbuckle |
| 5,886,644 | A | 3/1999 | Keskin et al. |
| 5,894,277 | A | 4/1999 | Keskin et al. |
| 5,901,238 | A | 5/1999 | Matsushita |
| 5,915,035 | A | 6/1999 | Hsiao et al. |
| 5,956,122 | A | 9/1999 | Doster |
| 5,973,624 | A | 10/1999 | Miller et al. |
| 5,991,408 | A | 11/1999 | Pearson et al. |
| 5,995,642 | A | 11/1999 | Hsu et al. |
| 6,011,858 | A | 1/2000 | Stock et al. |
| 6,012,064 | A | 1/2000 | Gibbons et al. |
| 6,016,476 | A | 1/2000 | Maes et al. |
| 6,018,739 | A | 1/2000 | McCoy et al. |
| 6,038,315 | A | 3/2000 | Strait et al. |
| 6,038,332 | A | 3/2000 | Fishbine et al. |
| 6,038,334 | A | 3/2000 | Hamid |
| 6,047,281 | A | 4/2000 | Wilson et al. |
| 6,047,282 | A | 4/2000 | Wilson et al. |
| D426,237 | S | 6/2000 | Wranne |
| 6,072,891 | A | 6/2000 | Hamid et al. |
| 6,092,192 | A | 7/2000 | Kanevsky et al. |
| 6,104,922 | A | 8/2000 | Baumann |
| 6,105,010 | A | 8/2000 | Musgrave |
| 6,108,636 | A | 8/2000 | Yap et al. |
| 6,111,977 | A | 8/2000 | Scott et al. |
| 6,119,096 | A | 9/2000 | Mann et al. |
| 6,140,939 | A | 10/2000 | Flick |
| 6,154,879 | A | 11/2000 | Pare, Jr. et al. |
| 6,160,903 | A | 12/2000 | Hamid et al. |
| 6,167,517 | A | 12/2000 | Gilchrist et al. |
| 6,213,391 | B1 | 4/2001 | Lewis |
| 6,256,737 | B1 | 7/2001 | Bianco et al. |
| 6,360,953 | B1 | 3/2002 | Lin et al. |
| 6,363,485 | B1 | 3/2002 | Adams et al. |
| 6,483,929 | B1 | 11/2002 | Murakami et al. |
| 6,487,662 | B1 | 11/2002 | Kharon et al. |
| 6,522,772 | B1 | 2/2003 | Morrison et al. |
| 6,618,806 | B1 | 9/2003 | Brown et al. |
| 6,697,947 | B1 | 2/2004 | Matyas, Jr. et al. |
| 6,725,303 | B1 | 4/2004 | Hoguta et al. |
| 6,735,695 | B1 | 5/2004 | Gopalakrishnan et al. |
| 6,751,734 | B1 | 6/2004 | Uchida |
| 6,819,219 | B1 | 11/2004 | Bolle et al. |
| 6,829,375 | B1 | 12/2004 | Higuchi |
| 6,871,242 | B1 | 3/2005 | Ho-Lung et al. |
| 6,944,773 | B1 | 9/2005 | Abrahams |
| 6,957,338 | B1 | 10/2005 | Sumino |
| 7,362,210 | B2* | 4/2008 | Bazakos et al. ............ 340/5.53 |
| 7,522,056 | B2* | 4/2009 | Roque ........................ 340/572.7 |
| 7,631,805 | B2* | 12/2009 | Larson et al. ................ 235/382 |
| 2002/0138768 | A1 | 9/2002 | Murakami et al. |
| 2002/0164058 | A1 | 11/2002 | Aggarwal |
| 2002/0183624 | A1 | 12/2002 | Rowe et al. |
| 2007/0205865 | A1* | 9/2007 | Rofougaran et al. ......... 340/10.1 |
| 2007/0252001 | A1* | 11/2007 | Kail et al. ..................... 235/380 |
| 2010/0084462 | A1* | 4/2010 | Scipioni et al. ............... 235/380 |

OTHER PUBLICATIONS

Zdenek, et al., "Biometric Authentication Systems," FI MU Report Series, FIMU-RS-2000-08, Nov. 2000.

Furusawa, M., "Advanced Encryption Standard (AES) Perspective and Strategies," Consumer Direct Link, Inc., Oct. 22, 2000, pp. 1-5.

McDowall, R.D., "Biometrics: The Password You'll Never Forget," LC GC Europe, Oct. 2000.

Bohm, et al., "Electronic Commerce: Who Carried The Risk of Fraud?" 2000 (3) The Journal of Information, Law and Technology (JILD), Oct. 31, 2000. http://elj.warwick.ac.uk/jitt/00-3/bohm.html.

"Who Goes There? Biometric Technologies Make You Your Best ID," How Computers Work, Part II, vol. 4, Issue 3, Aug. 2000, pp. 107-113.

Bracco, T., "Biometrics suites earn a thumbs up," Network World, vol. 17, No. 19, May 8, 2000.

Recktenwald, J., "Electronic authentication technology takes off," TechRepublic, Apr. 26, 2000.

Cambier, J., "Biometric Identification in Large Populations," Information Security Bulletin, Mar. 2000, pp. 17-26.

Pankanti et al., "Biometrics: The Future of Identification," Computer, IEEE, Feb. 2000, pp. 46-49.

Phillips et al., "An Introduction to Evaluating Biometric Systems," Computer, IEEE, Feb. 2000, pp. 56-63.

Reynolds et al., "Automatic Speaker Recognition," Humans, Computers and Speech Symposium, AAAS 2000 Meeting, Feb. 19, 2000.

Negin et al., "An Iris Biometric System for Public and Personal Use," Computer, IEEE, Feb. 2000, pp. 2-7.

Biometrics Working Group, "Best Practices in Testing and Reporting of Biometric Devices," Version 1.0, Jan. 12, 2000.

Bowman, E., "Everything You Need to Know About Biometrics," Identix Corporation, Jan. 2000.

Daugman, J., "Biometric Decision Landscapes," University of Cambridge, The Computer Laboratory, UCAM-CL-TR-482, Jan. 2000.

Prevost, J., "Biometrics With Limited Government Intervention: How to Provide for Privacy and Security Requirements of Networked Digital Environments," MIT 6.805/STS085: Ethics and Law on the Electronic Frontier, Fall 1999.

Schneier, B., "Security in the Real World: How to Evaluate Security Technology," Computer Security Journal, vol. XV, No. 4, 1999, pp. 1-14.

Haahr, M., "Introduction to Randomness and Random Numbers," Random.org, Jun. 1999. http://www.random.org/essay/html.

Lee et al., "A 600-dpi Capacitive Fingerprint Sensor Chip and Image-Synthesis Technique," IEEE Journal of Solid-State Circuits, vol. 34, No. 4, Apr. 1999, pp. 469-475.

Jun et al., "The Intel Random Number Generator," Cryptography Research, Inc., White Paper Prepared for Intel Corporation, Apr. 22, 1000.

Soutar, C., "Biometric system performance and security," Mytec Technologies, Inc., IEEE Workshop on Automatic Identification Advanced Technologies (AutoID '99), Sep. 1999, pp. 1-7.

Roddy et al., "Fingerprint Features—Statistical Analysis and System Performance Estimates," Feb. 10, 1999, pp. 1-64.

Boneh, D., "Twenty Years of Attacks on the RSA Cryptosystem," Notices of the AMS, Feb. 1999, pp. 203-213.

Grosse, P., "SignCrypt: Biometric Verification," Quintet, Inc., Feb. 1999, pp. 1-5.

Ankari, "BioMouse Plus, Biometric and Smart Card User Authentication," Discussion Paper, Jan. 1999.

"Biometric Encryption," Ch. 22, ICSA Guide to Cryptography, Edited by R. Nichols, McGraw-Hill (1999).

Ashbourn, J., "The Biometric White Paper," pp. 1-14, http://homepage.ntlworld.com/avanti/whitepaper_htm.

Woodward Jr., J., "DSS's Biometric ID Project," Testimony of John D. Woodward, Jr., For the Hearing of the Subcommittee on Domestic and International Monetary Policy, Committee on Banking and Financial Services, U.S. House of Representatives One Hundred Fifth Congress on "Biometrics and the Future of Money," May 20, 1998, pp. 1-11.

Schneier, B., "Security Pitfalls in Cryptography," Counterpane Systems, 1998, pp. 1-11.

Van Natta, et al., "Biometric Solutions to Personal Identification: A White Paper Describing Technologies Available for Establishing and Maintaining Your Identity in Cyberspace," Digital Persona, Providers of U.are.U, Fingerprint Recognition System, Jan. 1998, pp. 1-22.

Carver, C., "Information Warfare: Task Force XXI or Task Force Smith," Military Review, Sep.-Nov. 1998, pp. 26-30.

Avolio, F., "Identity Confirmed: Token, smart card and biometric authentication schemes are making their way from the movies to the mainstream," Network World, Aug. 24, 1998.

Page, D., "Biometrics: Facing Down the Identity Crisis," High Technology Careers Magazine, Feature Presentation, 1998. http://www.hightechcareers.com/doc198/biometrics198.html.

Jueneman, et al., "Biometrics and Digital Signatures in Electronic Commerce," 38 Jurimetrics, Spring 1998, pp. 1-31.

Jain, et al., "On-Line Fingerprint Verification," Nov. 26, 1996, pp. 1-36.

Tomko, G., "Biometric Encryption: New Developments in Biometrics," 18th International Privacy and Data Protection Conference, Sep. 19, 1996.

Menezes, et al., "Chapter 5: Pseudorandom Bits and Sequences," Handbook of Applied Cryptography, CRC Press, 1996, pp. 169-190.

* cited by examiner

METHODS AND SYSTEMS FOR PROVIDING ENHANCED SECURITY OVER, WHILE ALSO FACILITATING ACCESS THROUGH, SECURED POINTS OF ENTRY

PRIORITY

The present invention is a continuation-in-part of U.S. patent application Ser. No. 12/756,855, filed on Apr. 8, 2010, entitled "Point of entry authorization utilizing RFID enabled profile and biometric data," which is a continuation of U.S. patent application Ser. No. 10/321,872, filed Dec. 17, 2002, now U.S. Pat. No. 7,921,297 entitled "Random biometric authentication utilizing unique biometric signatures," which is a continuation-in-part of U.S. patent application Ser. No. 09/757,903, filed Jan. 10, 2001, now abandoned entitled "Random biometric authentication methods and systems." All the applications are incorporated by reference herein in their entirety.

TECHNICAL FIELD

The present invention is generally related to security and to systems and methods providing access to secured points of entry such as buildings, international ports of entry, and entertainment venues. More particularly, the present invention is related to RFID enhanced point of entry security and access control.

BACKGROUND

Security over points of entry such as sports venues, public and private facilities, and international ports of entry has rapidly become an important national security priority in recent years. With the proliferation of computers, computer networks, and other electronic devices and networks into all aspects of business and daily life, the concern over secure access and verification has grown tremendously. The ability to secure points of entry is particularly important for commerce, government, and entertainment endeavors that often attract large numbers of people to a single location. The ability to protect private data and assure validity of verification data is also of great concern.

A problem that is inevitably encountered after providing high levels of security over points of entry is with the developing backup of people wanting to pass through the points of entry where security is increased. For example, large sports venues are challenged with making sure that people entering a venue are authorized (ticketed) to gain access to the venue, but with increasing concern over threats to large congregations of people in public venues, venue operators are also having to be concerned that venue attendees are not bringing weapons, explosives, or harmful chemical/biological agents into the venue. Currently, general observation or searches are conducted of venue attendees and then attendees must also present a ticket or season pass to gain entry into a sports venue. Thousands of people are typically passing through gates as the points of entry into a sports venue. Any additional security measures than what is already being provided would likely only further slow down the process of providing venue attendees with access to the venue.

Many people also pass through points of entry on a regular basis. Such is the case at the international border crossing between El Paso, Tex. and Ciudad Juarez, Mexico where tens of thousands of people cross daily from home to work and back between these two large cities of neighboring countries. At sports venues, season pass holders, and venue employees gain regular access to sports venues. Secure facilities, such as government buildings and manufacturing plants, have several employees accessing a facility on a regular basis. In all three scenarios, it is difficult for point of entry personnel to recognize hundreds or thousands of people that are authorized to pass through a point of entry and manage its security.

The present inventors believe that Radio-frequency identification (RFID) technology can be used to improve point of entry security and passage control. RFID is the use of an object (typically referred to as an RFID tag) applied to or incorporated into a product, animal, or person for the purpose of identification and tracking using radio waves. Some tags can be read from several meters away and beyond the line of sight of the reader; others are designed to read at very close proximity to a RFID tag. Radio-frequency identification involves RFID interrogators (also known as readers or detectors) and tags (also known as labels). Most RFID tags contain at least two parts. One is an integrated circuit for storing and processing information, modulating and demodulating a radio-frequency signal, and other specialized functions. The second is an antenna for receiving and transmitting the signal. There are generally three types of RFID tags: active RFID tags, which contain a battery and can transmit signals autonomously; passive RFID tags, which have no battery and require an external source to provoke signal transmission; and battery assisted passive (BAP) RFID tags, which require an external source to wake up, but have significant higher forward link capability providing greater range. RFID tags are currently printable. New RFID tags with circuitry deposited by simple printing technologies can make it cost effective to tag low-value products on retail shelves for information or purchasing purposes. It is believed that mobile phones with built-in RFID scanners can let consumers access information about tagged products or even pay for them without waiting in line. RFID tags can also be read at varying distances, depending on the tag and the reader. For example, passive Ultra-HighFID tags can be read at a distance of several meters, depending on the reader. There is also wide use of RFID tags in medical applications. RFID tags embedded under human skin to carry access information, medical records, and other data have been proposed in recent years.

What are needed are systems and methods that can provide enhanced security over points of entry while also facilitating access through points of entry by regular authorized users. Based on the foregoing need, those skilled in the art can appreciate that despite the advances in security over facilities, ports of entry, and entertainment venues, most methods and systems of providing point of entry security and facilitating access therefore are still plagued with various human, physical, and electronic drawbacks. The present inventors believe that the RFID-based systems and methods and systems disclosed herein overcome many drawbacks known in the art.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

In accordance with features of the present invention, a system and method can be provided for the verification of a registered user with authorized access through a point of entry in coordination with registered user profile information obtained from a remote server after preliminary identification of the registered user based on an identification number obtained wirelessly by an RFID reader from an RFID tag carried by the registered user when the user is located near a point of entry.

In accordance with a feature of the present invention, a system for verifying the identity of a user at a point of entry can include a preliminary identification RFID reader located near a point of entry for scanning a preliminary identification zone near the point of entry for RFID signals including identification numbers associated with registered users having access through the point of entry.

In accordance with a feature of the present invention, a system for verifying the identity of a user at a point of entry can include verification RFID reader located at the point of entry for scanning a passage zone at the point of entry for identification numbers associated with registered users having access through the point of entry.

In accordance with another feature of the present invention, a system for verifying the identity of a user at a point of entry can include a computer and video monitor located at the point of entry and including data network access to a remote server to obtain user profiles associated with identification numbers detected by the preliminary identification RFID and the verification RFID.

In accordance with yet another feature of the present invention, a system for verifying the identity of a user at a point of entry can further include a remote server that stores a user profile, wherein the identification information provided by the electronic device is utilized to obtain the user profile from the remote server via the data network, the user profile including user identification information such as a photograph and user name.

In accordance with methods of implementing features of the present invention, a system for verifying the identity of a user at a point of entry can include security personnel using the computer at the point of entry utilizing user profile information obtained from the server to at least one of a photograph displayed on said video monitor with the user's appearance, a biometric sample provided by user to the biometric template, and credentials carried by the user to the user name and granting the user access through the point of entry, if the at least one of the user's appearance, biometric sample, and credentials match at least one of the photograph, user name, and a biometric attribute stored in the biometric template displayed or provided by the system.

The RFID tag can be associated with at least one of a ticket and a portable electronic device. A portable electronic device can be used to boost an RFID tag signal for receipt by an RFID reader and/or communicate with an electronic system associated with a point of entry via, for example, a Bluetooth communications link, 802.11 (Wi-Fi) link, or a cellular communications link.

DRAWINGS

The accompanying figures, in which like reference numerals refer to identical or functionally-similar elements throughout the separate views and which are incorporated in and form a part of the specification, further illustrate the embodiments and, together with the detailed description of the invention, serve to explain the principles of the embodiments.

DETAILED DESCRIPTION

The particular values and configurations discussed in these non-limiting examples can be varied and are cited merely to illustrate at least one embodiment and are not intended to limit the scope thereof.

The present inventors have already proposed systems and methods for securing points of entry utilizing RFID tags, wireless communications systems, remote server and database access, and biometric readers located at points of entry. The present invention claims priority to U.S. patent application Ser. No. 12/756,855, entitled "Point of entry authorization utilizing RFID enabled profile and biometric data," which have been incorporated by reference herein for its teaching and which also enjoys a priority date Jan. 10, 2001 for the foregoing systems and methods.

The improvement that the present inventors will describe herein includes the use of RFID readers operable in two distinct zones around a point of entry. The two zones are preliminary identification zones and verification zones, and provide a two-step process of reading RFID tags for security/access purposes. Preliminary identification zones utilize RFID tag readers to wirelessly obtain an identification number from an RFID tag carried by/on a user and that can be used to obtain profile information associated with the user from a remote database. Ideally, preliminary identification zone RFID readers can read RFID tags at distances greater than ten feet; however, preliminary identification zone RFID readers should not be limited to a particular distance because applications are foreseeable where a close proximity RFID reader are better suited for use in light of the present disclosure. Verification zones utilize RFID tag readers that are collocated with a physical point of entry and designed to detect the presence of a user in close proximity to the physical point of entry, e.g., up to about ten feet, so that profile information can be retrieved for comparison by point of entry personnel (e.g., security guards or gate personnel) with the user or credentials carried by the user.

Figure 1:
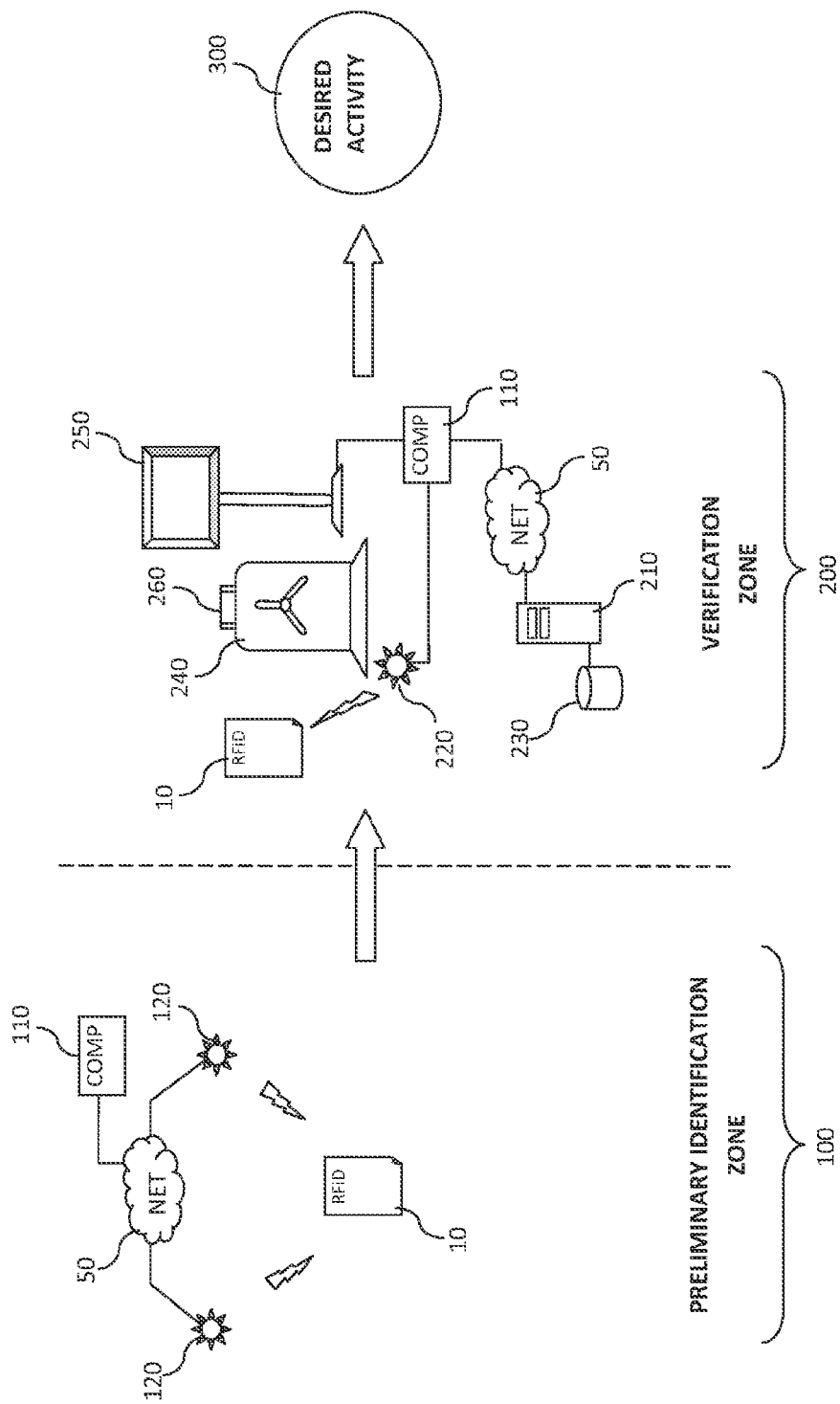
FIG. 1 illustrates a system diagram of components for an electronic system associated with RFID tag readers located in preliminary identification zones and verification zones, and network access to a database containing registered user profiles used to verify users, in which embodiments can be implemented.

FIG. 1 illustrates a system diagram of components for an electronic system associated with RFID tag readers 120, 220 located in preliminary identification zones 100 and verification zones 200 and managed by a computer having network access 50 to a database 230 containing registered user profiles that can be used to verify users. The system includes at least one preliminary identification RFID reader 120 scanning a preliminary identification zone 100 near a point of entry for RFID signals from RFID tags 10 carried by registered users and that include identification numbers associated with registered users having access to/through the point of entry 240 in pursuit of a desired activity 300. Identification numbers are also associated with user profiles stored in a remote server 210 that are accessible by the system through the network 50 by a computer 110 located at the point of entry. A video monitor 250 can also be located at the point of entry. The computer accesses the remote server 210 to obtain user profiles associated with identification numbers detected by the preliminary identification RFID reader 120 of a user in the preliminary identification zone 100 and also by the verification RFID reader 220 when a registered user is in a verification zone 200. When a registered user is in the verification zone 200, the user's RFID tag 10 is detected by the verification RFID reader 220 and user profile information, which has already been retrieved from the remote server 210, is accessed, displayed, and/or presented by the system and security personnel at the point of entry can now utilize user profile information obtained from the server 210 to verify that the user is authorized to access/pass through the point of entry 240 and to the desired activity 300. Security personnel verify the user by comparing at least one of said photograph displayed on said video monitor 250 with the user's appearance, comparing a biometric sample provided by user at a biometric reader 260 to biometrics stored in a biometric template provided with the user's profile information, and/or comparing credentials carried by the user to a user name displayed on the video monitor 250. Once user identity and authorization is validated, security personnel can grant the user access through the point of entry 240. Access is granted to/through the point of entry 240 only if at least one of the user's appearance, biometric sample, and credentials (e.g., identification card) match at least one of the displayed photograph, displayed user name, and biometrics provided in the biometric template associated with the identification number retrieved from the RFID tag to obtain profile information from the server 210. This RFID-based system, therefore, provides enhanced security while also expediting user verification and passage through points of entry, which is a great advantage over prior systems.

Figure 2:
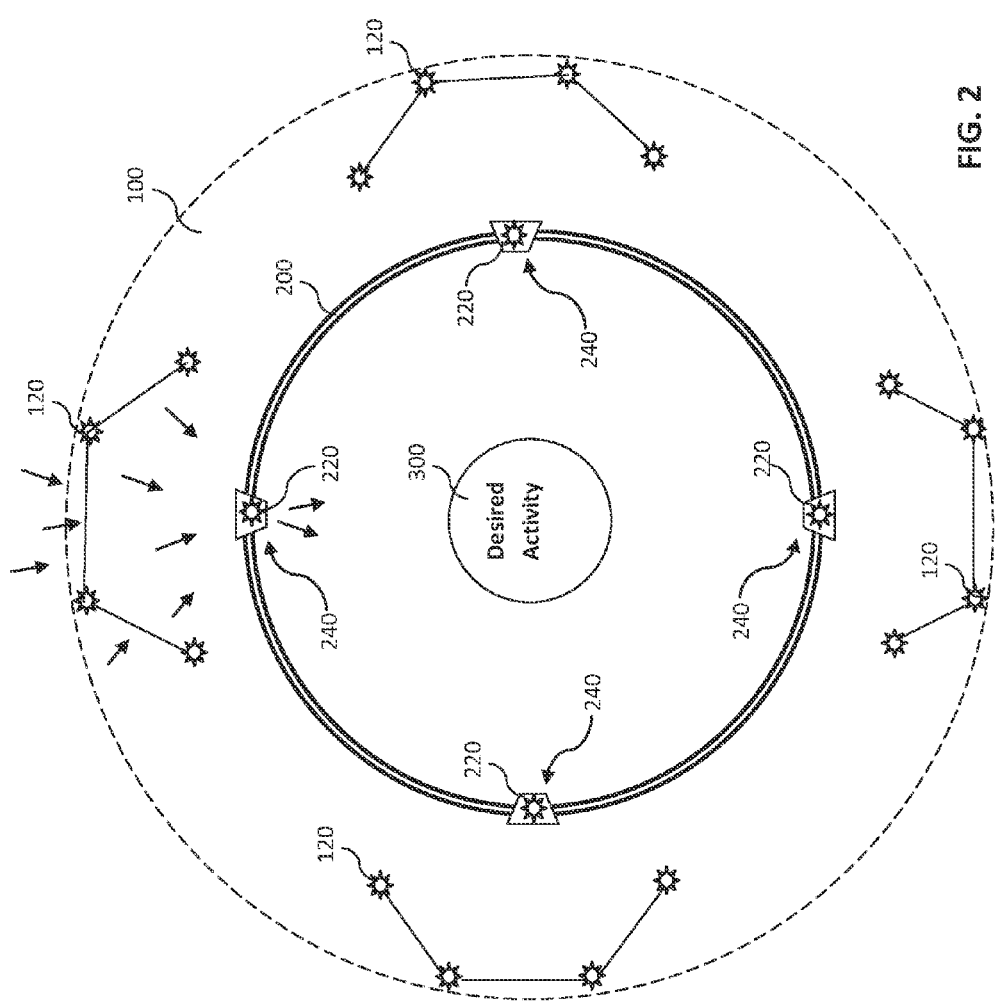
FIG. 2 illustrates a system diagram for implementation of an electronic system around a desired activity (e.g., entertainment venue) for verifying registered users authorized for passage through points of entry using RFID readers associated with the points of entry at preliminary identification zones and verification zones, in accordance with features of the invention.

FIG. 2 illustrates a system diagram for implementation of an electronic RFID-based security system around a desired activity 300 (e.g., entertainment venue) for verifying registered users authorized for passage through points of entry 240 using RFID readers 120, 220 associated with the points of entry 240 at preliminary identification zones 100 and verification zones 200, in accordance with features of the invention. Assuming, for example, that the desired activity is a sports stadium, the preliminary identification zone 100 can be the area typically surrounding entry gates into the sports venue. Several RFID readers would be deployed around the preliminary identification zone 100. Familiar preliminary identification zone areas are the sidewalk areas outdoors and surrounding the sports venue between the sports venue and parking areas of public streets. The identification zone 200 for a sports venue in this example would be the area immediately before a gate where an entry ticket is typically taken by gate personnel. Ideally, the identification zone would be about no more than a 10 foot radius from the entry point/gate so that verification RFID readers are not over tasked with retrieving multiple profiles and displaying multiple pictures on a video display. Only one RFID tag reader can be used with each point of entry, as compared to the multiple RFID tag readers that may be needed to cover the preliminary identification zone.

Figure 3:
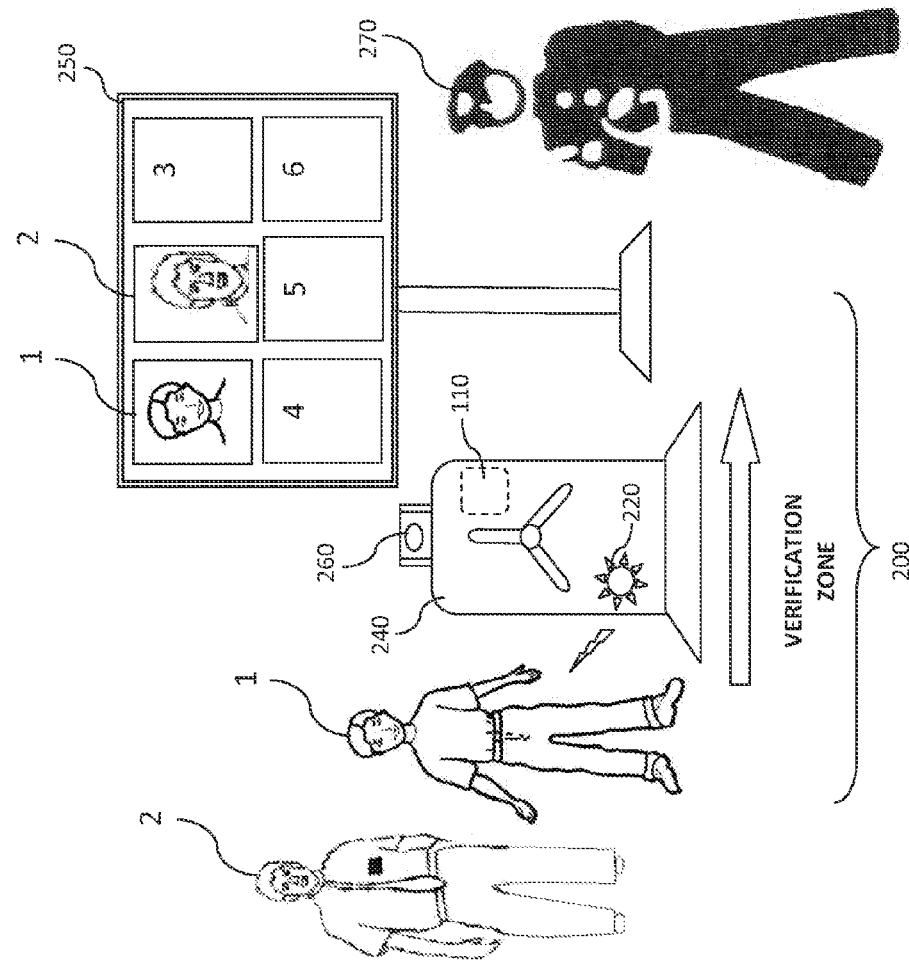
FIG. 3 illustrates a system diagram for implementation of an electronic system near a desired activity (e.g., port of entry, entertainment venue) for verifying registered users authorized for passage through points of entry using RFID readers associated with the points of entry at preliminary identification zones and verification zones, in accordance with features of the invention.
Figure 3:
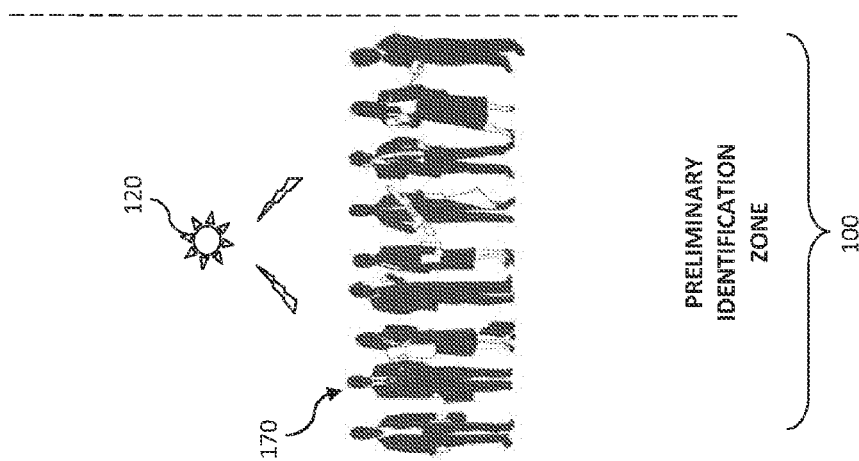

FIG. 3 illustrates a system diagram for implementation of an RFID-based electronic verification and security system near a desired activity (e.g., port of entry, entertainment venue). As previously described, RFID readers 120, 220 associated with the points of entry 240 in preliminary identification zones 100 and verification zones 200 for verifying are used to detect and verify registered users authorized for passage through points of entry, in accordance with features of the invention. A large group of people 170 are shown standing within or moving about a preliminary identification zone 100 while a preliminary RFID reader 120 scans the area for RFID tags carrying identification numbers that can be used to retrieve profiles from a remote database. As people 1, 2 enter the verification zone near a point of entry 240, a verification zone RFID reader 220 reads RFID tags carried by the people 1, 2 to obtain identification numbers needed to present profile information already retrieved from a remote server because of the preliminary identification zone RFID reader 120 operation. The people's 1, 2 photographs can be displayed on the display screen 250 so that gate personnel 270 can compare the photographs to the people. If the photographs match, the people can pass through the point of entry 240. If the gate personnel cannot establish a match between displayed photographs and the people that present themselves to the point of entry, then the gate personnel can request that the people 1, 2 provide a biometric sample to a biometric reader 260 located at the point of entry 240. A biometric sample can also be obtained where photographs are not available for the people 1, 2. The display can ideally be large enough to display photographs and/or names for several people that may be located within the read radius of the verification zone RFID reader at one time. The reader in FIG. 3 shows room for six photographs, although it should be known that more photographs can be provided depending on photograph size and screen size.

Figure 4:
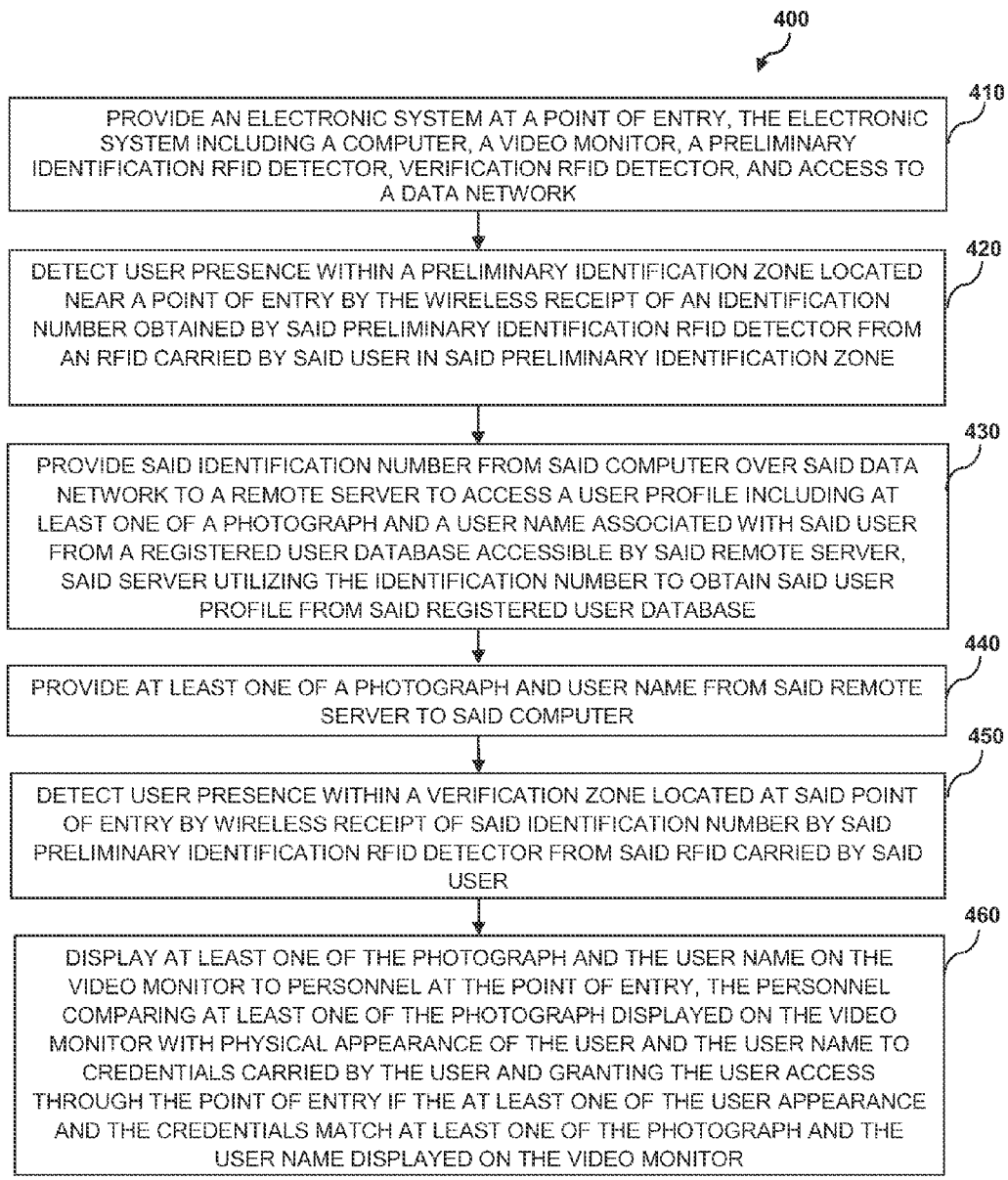
FIG. 4 illustrates a high-level flow chart of steps for verifying a registered user in association with a RFID tag reading system, in accordance with an alternative embodiment.

FIG. 4 illustrates a high-level flow chart of steps for verifying a registered user in association with a RFID tag reading system, in accordance with features of the present invention. Referring to block 410, an electronic system is provided at a point of entry. The electronic system includes a computer, a video monitor, a preliminary identification RFID detector, verification RFID detector, and access to a data network. Once the system is provided, it is put into use. As shown in block 420, the system is used to detect registered user presence within a preliminary identification zone located near a point of entry by the wireless receipt of an identification number obtained by the preliminary identification RFID reader from an RFID carried by the user in the preliminary identification zone. As shown in block 430, the identification number is provided from a computer over said data network to a remote server to access a user profile including at least one of a photograph and a user name associated with said user from a registered user database accessible by said remote server, said server utilizing the identification number to obtain said user profile from said registered user database. As shown in block 440, at least one of a photograph and user name is provided from said remote server to said computer. As shown in block 450, user presence is detected within a verification zone located at the point of entry by wireless receipt of the identification number by the preliminary identification RFID detector from the RFID carried by the user. Then as shown in block 460, at least one of the photograph and the user name is displayed on the video monitor to personnel at the point of entry where the personnel compare at least one of the photograph displayed on the video monitor with physical appearance of the user and the user name to credentials carried by the user and grant the user access through the point of entry if the at least one of the user appearance and the credentials match at least one of the photograph and the user name displayed on the video monitor.

Figure 5:
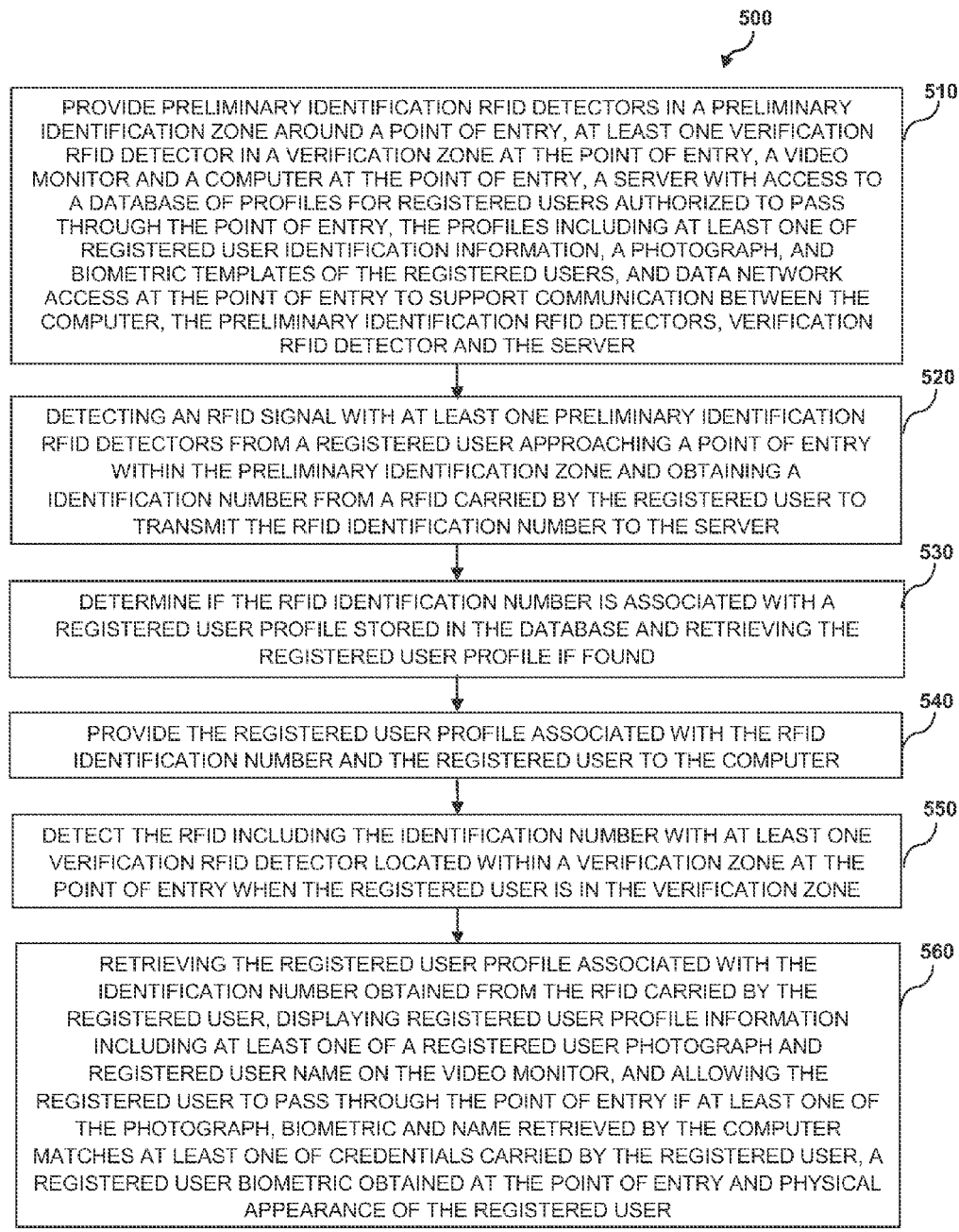
FIG. 5 illustrates a high-level flow chart of steps for verifying a registered user with authorized access through a point of entry using a RFID-based system, in accordance with an alternative embodiment.

FIG. 5 illustrates a high-level flow chart of steps for verifying a registered user with authorized access through a point of entry using a RFID-based system, in accordance with features of the present invention. Referring to block 510, a security system is provided including preliminary identification RFID detectors in a preliminary identification zone around a point of entry, at least one verification RFID detector in a verification zone at the point of entry, a video monitor, and a computer at the point of entry, a server with access to a database of profiles for registered users authorized to pass through the point of entry, the profiles including at least one of registered user identification information, a photograph, and biometric templates of the registered users, and data network access at the point of entry to support communication between the computer, the preliminary identification RFID detectors, verification RFID detector, and the server. Referring to block 520, An RFID signal is detected with at least one preliminary identification RFID detector from a registered user approaching a point of entry within the preliminary identification zone and an identification number is obtained from the RFID tag carried by the registered user to transmit the RFID identification number to the server. As shown in block 530, it is determined if the RFID identification number is associated with a registered user profile stored in the database and the registered user profile is retrieved if found. As shown in block 540, the registered user profile associated with the RFID identification number and the registered user is provided to the computer. As shown in block 550, the RFID including the identification number is detected with at least one verification RFID detector located within a verification zone at the point of entry when the registered user is in the verification zone. Then as shown in block 560, the registered user profile associated with the identification number obtained from the RFID carried by the registered user is retrieved, registered user profile information including at least one of a registered user photograph and registered user name is displayed on the video monitor, and the registered user is allowed to pass through the point of entry if at least one of the photograph, biometric, and name retrieved by the computer matches at least one of credentials carried by the registered user, a registered user biometric obtained at the point of entry, and physical appearance of the registered user.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for verifying the identity of a user at a point of entry, comprising the steps of:
   providing an electronic system at a point of entry, the electronic system including a computer, a video monitor, a preliminary identification RFID reader, verification RFID reader, and access to a data network;
   detecting user presence within a preliminary identification zone located near a point of entry by the wireless receipt of an identification number obtained by said preliminary identification RFID reader from an RFID carried by said user in said preliminary identification zone;
   providing said identification number from said computer over said data network to a remote server to access a user profile including at least one of a photograph and a user name associated with said user from a registered user database accessible by said remote server, said server utilizing the identification number to obtain said user profile from said registered user database;
   providing at least one of a photograph and user name from said remote server to said computer;
   detecting user presence within a verification zone located at said point of entry by wireless receipt of said identification number by said preliminary identification RFID reader from said RFID carried by said user; and
   displaying at least one of said photograph and said user name on said video monitor to personnel at said point of entry, said personnel comparing at least one of said photograph displayed on said video monitor with physical appearance of the user and said user name to credentials carried by the user and granting the user access through the point of entry if the at least one of said user appearance and said credentials match at least one of said photograph and said user name displayed on said video monitor.

2. The method of claim 1, wherein said RFID carried by the registered user operates wirelessly and is associated with at least one of a venue ticket, an identification card, a smartphone, and a RFID tag.

3. The method of claim 1, wherein said photograph comprises an image of a face of the user associated with said registration number and said profile.

4. The method of claim 1, wherein the credentials carried by the user comprise an identification medium bearing a name and a photograph of the user.

5. The method of claim 1, further comprising providing a biometric reader at said point of entry and a step wherein said registered user also provides at least one of fingerprint data, retinal scan data, handwriting data, voice data, skin tissue data, and facial data to said biometric interface to gain access through said point of entry.

6. The method of claim 1, wherein said point of entry comprises at least one of: an entry gate at a sports and entertainment venue, an entry doorway to a manufacturing facility, an entry doorway to a building, a international port of entry from one country to another country, and a security checkpoint in a public transportation terminal.

7. The method of claim 6, wherein said RFID carried by the registered user operates wirelessly and is associated with at least one of a venue ticket, an identification card, a smartphone, and a RFID tag.

8. The method of claim 6, wherein said photograph comprises an image of a face of the user associated with said registration number and said profile.

9. The method of claim 6, wherein the credentials carried by the user comprise an identification medium bearing a name and a photograph of the user.

10. The method of claim 6, further comprising a step wherein a biometric interface comprising a biometric reader is provided at said point of entry and the registered user is required to provide at least one of fingerprint data, retinal scan data, handwriting data, voice data, and facial data to said biometric interface to gain access through said point of entry.

11. A method for securing access through points of entry, comprising:
   providing preliminary identification RFID readers in a preliminary identification zone around a point of entry;
   providing at least one verification RFID reader in a verification zone at said point of entry;

providing a video monitor and a computer at said point of entry;

providing a server with access to a database of profiles for registered users authorized to pass through said point of entry, said profiles including at least one of registered user identification information, a photograph, and biometric templates of said registered users;

providing data network access at said point of entry to support communication between said computer and said preliminary identification RFID readers, said at least one verification RFID reader and said server;

detecting an RFID signal with at least one preliminary identification RFID reader from a registered user approaching a point of entry within said preliminary identification zone and obtaining a identification number from a RFID carried by said registered user, transmitting said RFID identification number to said server;

determining if the RFID identification number is associated with a registered user profile stored in said database and retrieving said registered user profile if found;

providing said registered user profile associated with said RFID identification number and the registered user to said computer that is located at said point of entry;

detecting said RFID signal including said identification number with at least one verification RFID reader located within said verification zone at said point of entry when said registered user is in said verification zone;

said computer retrieving said registered user profile associated with said identification number obtained from said RFID carried by said registered user, displaying registered user profile information including at least one of a registered user photograph and registered user name on said video monitor, and allowing said registered user to pass through said point of entry if at least one of said photograph, biometric, and name retrieved by said computer matches at least one of credentials carried by said registered user, a registered user biometric obtained at said point of entry, and physical appearance of said registered user.

12. The method of claim 11, wherein said RFID carried by the registered user operates wirelessly and is associated with at least one of a venue ticket, an identification card, a smartphone, and a RFID tag.

13. The method of claim 11, wherein said photograph comprises an image of a face of the user associated with said registration number and said profile.

14. The method of claim 11, wherein the credentials carried by the user comprise an identification medium bearing a name and a photograph of the user.

15. The method of claim 11, further comprising a step wherein a biometric interface comprising a biometric reader is provided at said point of entry and the registered user is required to provide at least one of fingerprint data, retinal scan data, handwriting data, voice data, and facial data to said biometric interface to gain access through said point of entry.

16. The method of claim 11, wherein said point of entry comprises at least one of: an entry gate at a sports and entertainment venue, an entry doorway to a manufacturing facility, an entry doorway to a building, a international port of entry from one country to another country, and a security checkpoint in a public transportation terminal.

17. The method of claim 16, wherein said RFID carried by the registered user operates wirelessly and is associated with at least one of a venue ticket, an identification card, a smartphone, and a RFID tag.

18. The method of claim 16, wherein said photograph comprises an image of a face of the user associated with said registration number and said profile.

19. The method of claim 16, wherein the credentials carried by the user comprise an identification medium bearing a name and a photograph of the user.

20. The method of claim 16, further comprising a step wherein a biometric interface comprising a biometric reader is provided at said point of entry and the registered user is required to provide at least one of fingerprint data, retinal scan data, handwriting data, voice data, skin tissue data, and facial data to said biometric interface to gain access through said point of entry.

21. A system for verifying the identity of a user at a point of entry, comprising:

a preliminary identification RFID reader located near a point of entry scanning a preliminary identification zone near said point of entry for RFID signals including identification numbers associated with registered users having access through said point of entry;

a verification RFID reader located at said point of entry scanning a passage zone at said point of entry for identification numbers associated with registered users having access through said point of entry; and a computer and video monitor located at said point of entry and including data network access to a remote server to obtain user profiles associated with identification numbers detected by said preliminary identification RFID and said verification RFID;

wherein security personnel using said computer at said point of entry utilize user profile information obtained from said server to do at least one of: render at least one of said photograph displayed on said video monitor and compare it with the user's appearance, compare a biometric sample provided by user with a biometric obtained from a biometric template, and compare credentials carried by the user to said user name displayed on said video monitor, and granting the user access through the point of entry, if the at least one of the user's appearance, said biometric sample, and said credentials match at least one of said photograph, said user name, and said biometric template.

22. The method of claim 21, wherein said RFID carried by the registered user operates wirelessly and is associated with at least one of a venue ticket, an identification card, a smartphone, and a RFID tag.

23. The system of claim 21, wherein said photograph comprises an image of a face of the user associated with said registration number and said profile.

24. The system of claim 21, wherein the credentials carried by the user comprise an identification medium bearing a name and a photograph of the user.

25. The system of claim 21, further comprising a biometric reader at said point of entry, wherein the registered user is required to provide at least one of fingerprint data, retinal scan data, handwriting data, voice data, and facial data to said biometric interface to gain access through said point of entry.

26. The system of claim 21, wherein said point of entry comprises at least one of: an entry gate at a sports and entertainment venue, an entry doorway to a manufacturing facility, an entry doorway to a building, a international port of entry from one country to another country, and a security checkpoint in a public transportation terminal.

27. The system of claim 26, wherein said RFID carried by the registered user operates wirelessly and is associated with at least one of a venue ticket, an identification card, a smartphone, and a RFID tag.

28. The system of claim 26, wherein said photograph comprises an image of a face of the user associated with said registration number and said profile.

29. The system of claim 26, wherein the credentials carried by the user comprise an identification medium bearing a name and a photograph of the user.

30. The system of claim 26, further comprising a step wherein a biometric interface comprising a biometric reader is provided at said point of entry and the registered user is required to provide at least one of fingerprint data, retinal scan data, handwriting data, voice data, skin tissue data, and facial data to said biometric interface to gain access through said point of entry.

* * * * *